(12) United States Patent
Shetty et al.

(10) Patent No.: US 10,353,870 B2
(45) Date of Patent: Jul. 16, 2019

(54) TRACKING STRUCTURE FOR DATA REPLICATION SYNCHRONIZATION

(71) Applicant: NetApp Inc., Sunnyvale, CA (US)

(72) Inventors: Rithin Kumar Shetty, Sunnyvale, CA (US); Andrew Eric Dunn, Sunnyvale, CA (US)

(73) Assignee: NetApp Inc., Sunnyvale, CA (US)

( * ) Notice: Subject to any disclaimer, the term of this patent is extended or adjusted under 35 U.S.C. 154(b) by 468 days.

(21) Appl. No.: 15/045,551

(22) Filed: Feb. 17, 2016

(65) Prior Publication Data

US 2017/0235805 A1    Aug. 17, 2017

(51) Int. Cl.
*G06F 16/178* (2019.01)

(52) U.S. Cl.
CPC ................................. *G06F 16/178* (2019.01)

(58) Field of Classification Search
CPC combination set(s) only.
See application file for complete search history.

(56) References Cited

U.S. PATENT DOCUMENTS

| 9,804,928 B2* | 10/2017 | Davis | G06F 11/1464 |
| 9,880,905 B2* | 1/2018 | Guthrie | G06F 11/1451 |
| 2015/0006846 A1* | 1/2015 | Youngworth | G06F 3/0689 |
| | | | 711/216 |

* cited by examiner

*Primary Examiner* — Shyue Jiunn Hwa
(74) *Attorney, Agent, or Firm* — Cooper Legal Group, LLC

(57) ABSTRACT

One or more techniques and/or computing devices are provided for utilizing a tracking structure for data replication synchronization. For example, a first storage controller, hosting first storage, may have a replication relationship with a second storage controller hosting second storage (e.g., write requests, modifying the first storage, may be replicated to the second storage). The first storage controller maintains a tracking structure comprising hash buckets, dynamic tree structures, and/or a tracking segment bitmap used to identify portions of the first storage as either comprising dirty data (e.g., data, modified by a write request not yet replicated to the second storage, that may be different than corresponding data within the second storage) or clean data (e.g., the same data as the second storage). The tracking structure may be used to resynchronize the second storage to the first storage, perform a quick resync, facilitate semi-synchronous replication, and/or perform snapshot-less resync.

20 Claims, 9 Drawing Sheets

TRACKING STRUCTURE FOR DATA REPLICATION SYNCHRONIZATION

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with primary access to data stored within a second storage device and/or other storage devices. The first storage controller and the second storage controller may be configured according to a disaster recovery relationship, such that the second storage controller may provide failover access to replicated data that was replicated from the first storage device to a secondary storage device, owned by the first storage controller, but accessible to the second storage controller (e.g., a switchover operation may be performed where the second storage controller assumes ownership of the secondary storage device and/or other storage devices previously owned by the first storage controller so that the second storage controller may provide clients with failover access to replicated data within such storage devices). In an example of a logical replication scheme, the second storage controller has ownership of the replicated data. The second storage controller may provide read-only access to the replicated data. The second storage controller may convert the replicated data to full read-write access upon failover. In an example of physical replication, the storage device, comprising the replicated data, is owned by the first storage controller until a failover/switchover to the second storage controller occurs.

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

In an example, two storage controllers within a storage cluster may be configured according to a high availability configuration, such as where the two storage controllers are locally connected to one another and/or to the same storage devices. In this way, when a storage controller fails, then a high availability partner storage controller can quickly takeover for the failed storage controller due to the local connectivity. Thus, the high availability partner storage controller may provide clients with access to data previously accessible through the failed storage controller.

In an example of a high availability configuration, high availability to data may be provided without using shared storage. In particular, high availability to data is provided using a synchronous replicated copy of a primary storage object. The high availability to data may be provided through a software defined architecture, using synchronous replication, and is not limited to merely two storage controllers.

Various replication and synchronization techniques may be used to replicate data (e.g., client data), configuration data (e.g., a size of a volume, a name of a volume, logical unit number (LUN) configuration data, etc.), and/or write caching data (e.g., cached write operations not yet flushed to a storage device, but cached within memory such as a non-volatile random access memory (NVRAM)) between storage controllers and/or storage devices. Synchronous replication may be used where an incoming write operation to the first storage controller is locally implemented upon a first storage object (e.g., a file, a LUN, a LUN spanning multiple volumes, or any other type of object) by the first storage controller and remotely implemented upon a second storage object (e.g., maintained as a fully synchronized copy of the first storage object) by the second storage controller before an acknowledgement is provided back to a client that sent the incoming write operation. In another example, asynchronous replication may be achieved by capturing snapshots of a volume, determining data differences (e.g., deltas) between a current snapshot and a last snapshot used to replicate data to the second storage object, and using incremental transfers to send the data differences to the second storage controller for implementation upon the second storage object. Semi-synchronous replication may be achieved where an acknowledgment back to a client for a write request is based upon local implementation upon the first storage object, but is not dependent upon remote implementation upon the second storage object.

Unfortunately, various issues such as a failure of a storage controller, a transient network issue, and/or other issues may cause the first storage controller and the second storage controller to become out-of-sync, such as a transition from a synchronous replication relationship to an asynchronous replication relationship that does not guarantee zero or near-zero recover point objectives (RPO) for clients. Substantial amounts of resource utilization and client data access disruption may occur when attempting to transition back from the asynchronous replication relationship to the synchronous replication relationship (e.g., overhead relating to the creation of snapshots, incremental transfers using snapshots, etc.).

DETAILED DESCRIPTION

Figure 1:
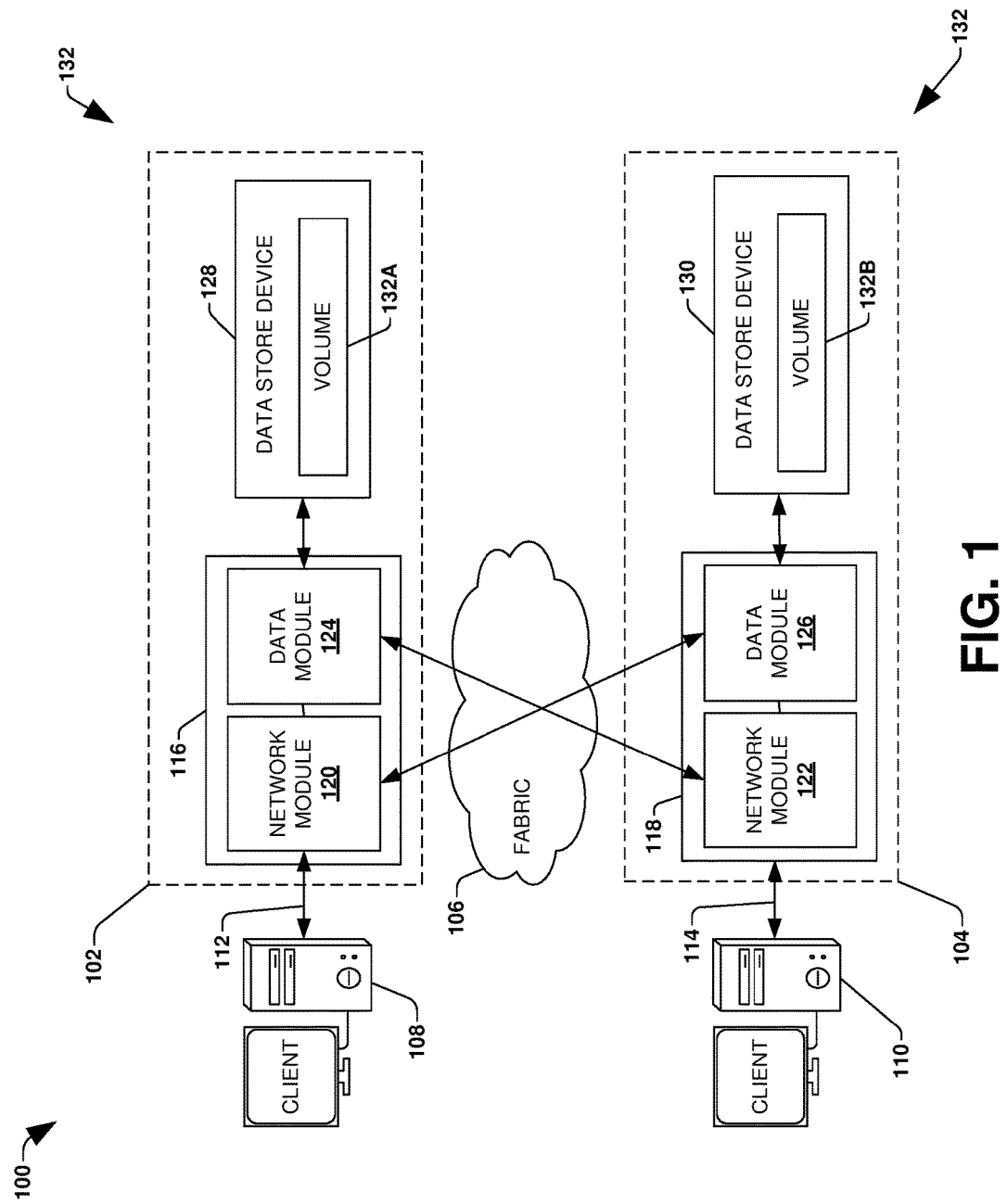
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for utilizing a tracking structure for data replication synchronization are provided herein. For example, a first storage controller and a second storage controller may have a replication relationship where if the first storage controller fails, then the second storage controller provides clients with failover access to replicated data (e.g., data replicated from first storage of the first storage controller to second storage of the second storage controller) corresponding to data previously accessible to clients through the first storage controller before the failure. If the first storage controller and the second storage controller fall out-of-sync, then substantial resource utilization and client disruption can occur when attempting to restore the replication relationship into a synchronous state. Accordingly, as provided herein, a tracking structure is maintained to track dirty data of the first storage. Dirty data may correspond to data within the first storage that was modified by a write request not yet replicated to the second storage, and thus the data may be different than corresponding replicated data within the second storage. The tracking structure may be used to resynchronize the replication relationship by efficiently identifying dirty data to send from the first storage to the second storage controller for updating the second storage. In this way, the tracking structure may be used to resynchronize the second storage to the first storage, perform a quick resync, facilitate semi-synchronous replication, and/or perform snapshot-less resync. The tracking structure may be dynamically created and/or deconstructed to conserve storage resources.

To provide context for utilizing a tracking structure for data replication synchronization, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that utilizing a tracking structure for data replication synchronization may be implemented within the clustered network environment 100. In an example, the node 116 (e.g., a first storage controller) may maintain a tracking structure used to identify dirty data within the volume 132A. The tracking structure may be used to identify and send dirty data from the volume 132A to the node 118 (e.g., a second storage controller) for updating the volume 132B, such as for resynchronization. It may be appreciated that utilizing a tracking structure for data replication synchronization may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
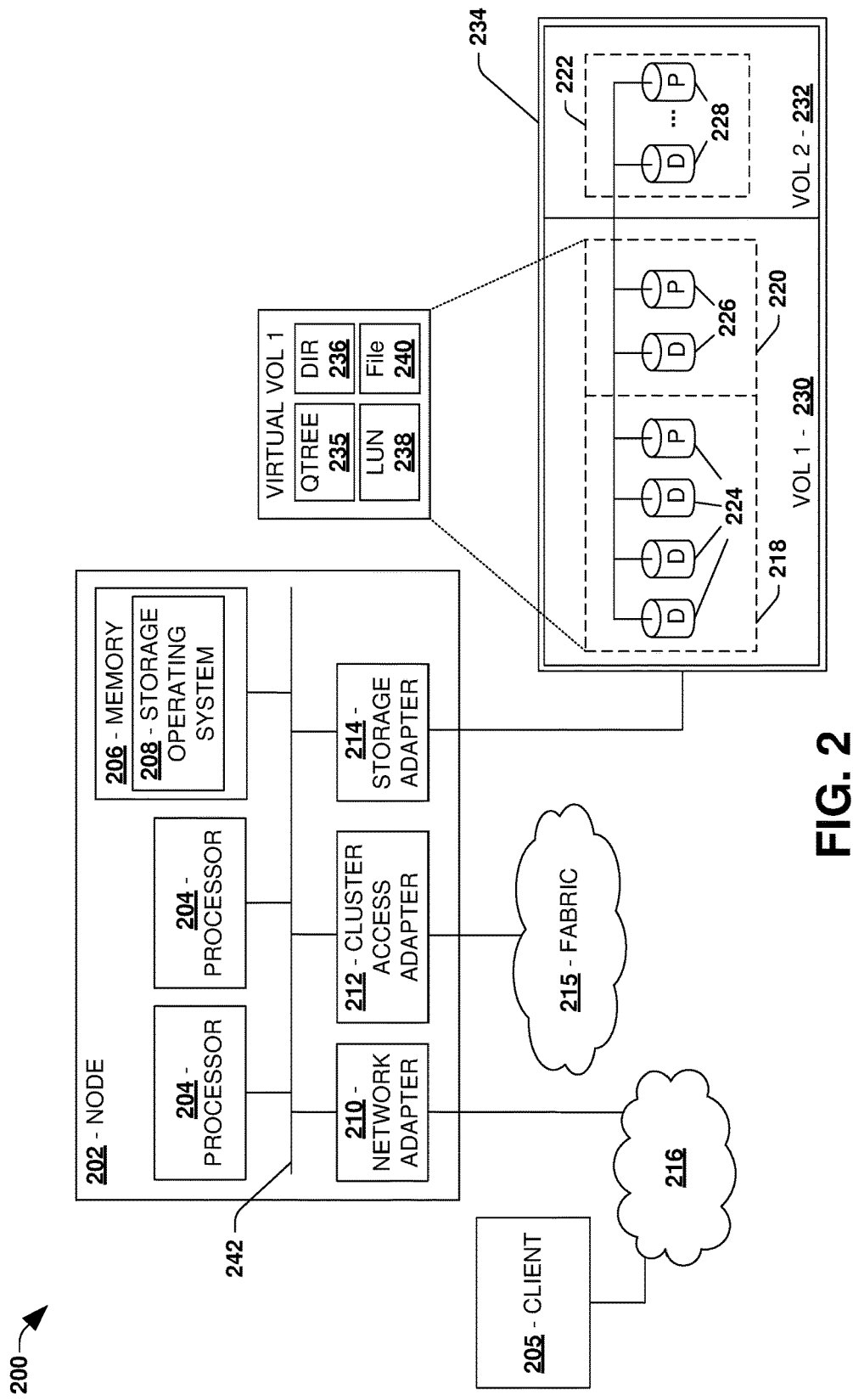
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234

(e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that utilizing a tracking structure for data replication synchronization may be implemented for the data storage system 200. In an example, the node 202 (e.g., a first storage controller) may maintain a tracking structure used to identify dirty data within the volume 230. The tracking structure may be used to identify and send dirty data from the volume 230 to a second node (e.g., a second storage controller) for updating a second volume, such as for resynchronization. It may be appreciated that utilizing a tracking structure for data replication synchronization may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
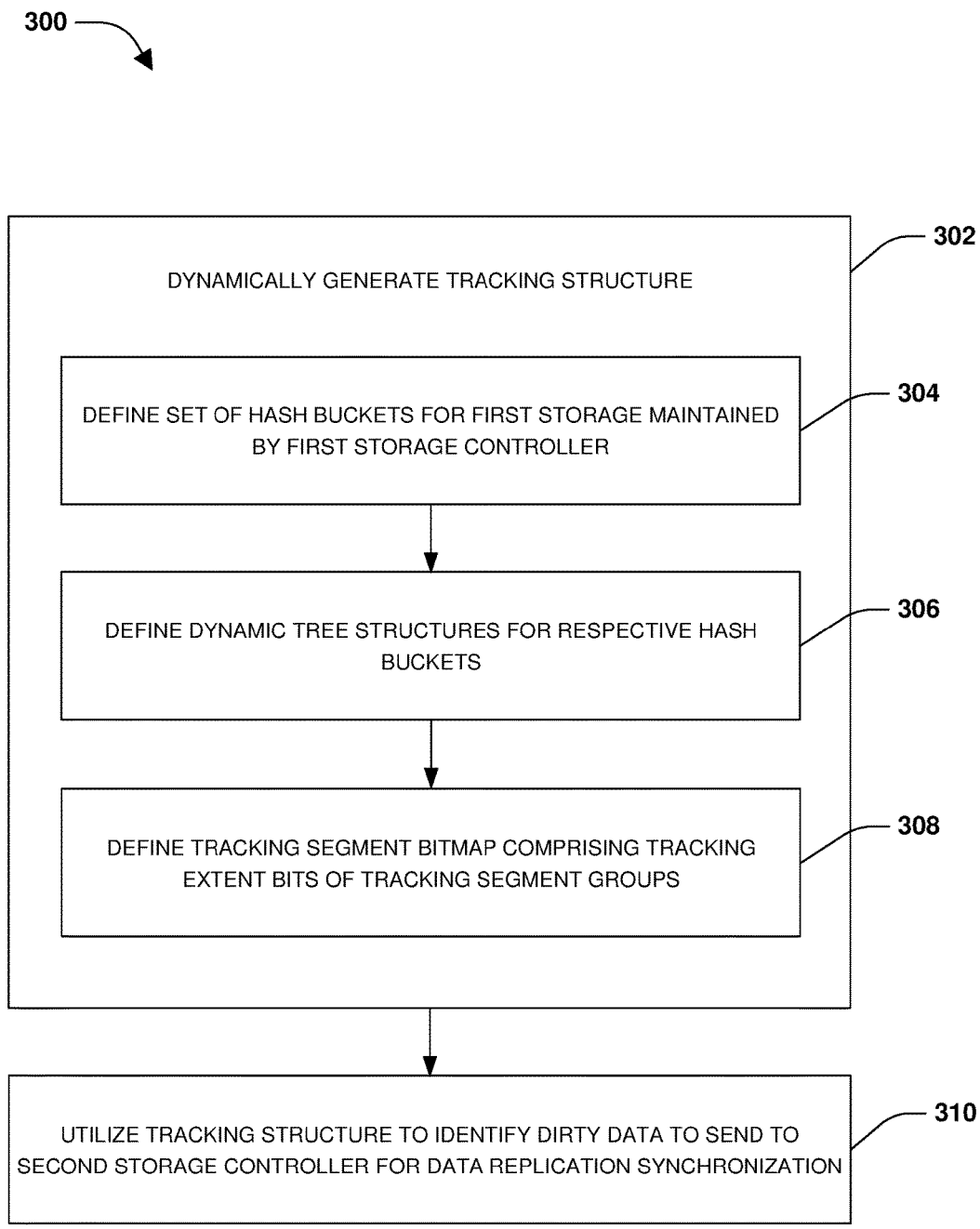
FIG. 3 is a flow chart illustrating an exemplary method of utilizing a tracking structure for data replication synchronization.

One embodiment of utilizing a tracking structure for data replication synchronization is illustrated by an exemplary method 300 of FIG. 3. For example, a first storage controller may host first storage within which a client may store data. The first storage controller may have a replication relationship (e.g., a synchronous replication relationship, an asynchronous replication relationship, a semi-synchronous replication relationship) with a second storage controller (e.g., hosted within the same storage site as the first storage controller or hosted within a remote storage site such as a different building, city, or location than the first storage controller), such that data is replicated from the first storage to second storage accessible to the second storage controller. The second storage controller may be configured as a disaster recovery partner for the first storage controller, such that if the first storage controller fails, then the second storage controller may provide clients with failover access to replicated data (e.g., data replicated from the first storage to the second storage whose ownership can be taken over by the second storage controller) previously accessible through the failed first storage controller.

At 302, a tracking structure may be dynamically generated. The tracking structure may comprise a set of hash buckets, dynamic tree structures, and/or a tracking segment bitmap that are stored within memory or persistently stored within persistent storage. The tracking structure may be used to track dirty data within the first storage. Accordingly, the tracking structure may be used to resynchronize the second storage with dirty data from the first storage in order to transition from an asynchronous replication state to a synchronous replication state. In another example, the tracking structure may be used, while maintaining the synchronous replication state, to perform a quick resynchronization if the second storage controller falls behind in updating the second storage with updates from the first storage. In another example, the tracking structure may be used to perform snapshot-less resynchronization. In another example, the tracking structure may be used to track dirty data for semi-synchronous replication.

At 304, the set of hash buckets are defined for the first storage (e.g., 16 TB of the first storage may be split into 16 hash buckets, where each hash bucket maps to 1 TB). A hash bucket may correspond to a tracking segment group of tracking segments that map to regions of the first storage (e.g., the tracking segment group may comprise 1,000 tracking segments, where a tracking segment maps to 1 GB of the 1 TB storage mapped to by the hash bucket). For example, the hash bucket, and thus the tracking segment group, may correspond to 1 TB or any other sized portion of the first storage. A tracking segment may correspond to 1 GB or any other sized portion of the 1 TB of the first storage. In an example, the tracking segment may map 4 kb or any other sized portion of memory to the 1 GB, thus efficiently utilizing memory for tracking dirty data (e.g., 4 kb of memory may be used to track dirty data for 1 GB of user data within the first storage). The tracking segment may comprise tracking extent groups of tracking extent bits mapped to portions of user data storage ranges within the first storage. For example, a tracking extent group may map 64 bits or any other sized portion of memory to 2 mb or any other sized portion of user data (e.g., 64 bits may be used to track dirty data for 2 mb of user data within the first storage). In this way, the tracking segment comprises tracking extent bits, grouped into tracking extent groups, which are mapped to user data storage ranges within the regions of the first storage (e.g., a tracking extent bit may map 1 bit of memory to 32 kb or any other sized portion of user data within the first storage). A tracking extent bit may be set to a dirty data indicator (e.g., a value of 1) or a clean data indicator (e.g., a value of 0) to indicate whether a user data storage range (e.g., 32 kb of user data within the first storage) has dirty data (e.g., data, of a user data storage range modified by a write request, which may be different than a corresponding user data storage range within the second storage) or clean data (e.g., the user data storage range comprises the same data as the corresponding user data storage range within the second storage). In this way, an offset of a write request may be hashed to identify a target hash bucket corresponding to a tracking segment comprising one or more tracking extent bits mapped to user data storage ranges of the first storage that is to be modified by the write request.

At 306, dynamic tree structures are defined for respective hash buckets of the set of hash buckets. For example, one dynamic tree structure may be defined per hash bucket. A dynamic tree structure may comprise nodes mapping to allocated tracking segments. For example, nodes may be dynamically added to the dynamic tree structure for tracking segments that are dynamically allocated for newly dirtied user data storage ranges. That is, instead of prepopulating the dynamic tree structure and thus preallocating memory for tracking segments, such nodes and tracking segments are dynamically allocated as corresponding portions of the first storage are dirtied and thus need to be tracked. In an example, the dynamic tree structure may comprise a red-black tree or any other dynamic structure. At 308, a tracking segment bitmap is defined to comprise tracking extent bits of tracking segment groups for which the set of hash buckets are defined. That is, the tracking segment bitmap is used to store the tracking extent bits that are set to either the dirty data indicator of the clean data indicator.

In an example of logging write requests into the tracking structure, a write request, targeting the first storage, may be received. A target hash bucket (e.g., corresponding to a tracking segment comprising one or more tracking extent bits mapped to user data storage ranges of the first storage that is to be modified by the write request) may be identified based upon a hash of an offset of the write request. A target dynamic tree structure, defined for the target hash bucket, may be evaluated. Responsive to the target dynamic tree structure comprising a target node for a target tracking segment encompassing user data storage ranges being modified by the write request, one or more target extent bits, corresponding to the user data storage ranges being modified by the write request, of the target tracking segment may be set to the dirty data indicator indicating that the user data storage ranges have dirty data.

Responsive to the target dynamic tree structure not comprising the target node, a new node may be dynamically created within the target dynamic tree structure. The new node may correspond to a new tracking segment (e.g., dynamically allocated in memory for the tracking segment bitmap) that will encompass the user data storage ranges being modified by the write request (e.g., new tracking extent bits, within the new tracking segment, may be set to the clean data indicator during allocation of the new tracking segment). One or more new tracking extent bits, corresponding to the user data storage ranges being modified by the write request, may be identified within the new tracking segment. The one or more new tracking extent bits may be set to the dirty data indicator to indicate that the user data storage ranges have dirty data. In this way, nodes may be dynamically created within the target dynamic tree structure and/or tracking segments may be dynamically allocated within the tracking segment bitmap for efficient storage utilization in comparison with preallocating all nodes and/or tracking segments for the entire first storage. In an example, multiple threads may be utilized to process multiple hash buckets in parallel for setting tracking extent bits, during logging, to indicate whether user data within the first storage is clean data or dirty data.

At 310, the tracking structure may be utilized to identify dirty data to send to the second storage controller for data replication synchronization. For example, the hash buckets may be processed to determine whether user data within the first storage is clean data or dirty data for sending dirty data to the second storage controller for updating the second storage. In an example, multiple hash buckets may be processed in parallel by multiple thresholds.

In an example of utilizing the tracking structure, the tracking structure may be utilized for performing a tracking structure synchronization (e.g., a resynchronization to transition from an asynchronous state to a synchronous state) to update the second storage to a current state of the first storage. In particular, respective hash buckets may be processed for identifying and sending dirty data to the second storage controller for updating the second storage. For example, a target node (e.g., a leaf node) representing a target tracking segment within the tracking segment bitmap, may be identified within a target dynamic tree structure of the target hash bucket. Tracking extent bits within the target tracking segment may be evaluated to identify one or more tracking extent bits with the dirty data indicator. Dirty data, identified by the one or more tracking extent bits, may be sent from the first storage to the second storage controller for updating the second storage in an effort to resynchronize the second storage to the current state of the first storage. Responsive to the second storage controller updating the second storage, the one or more tracking extent bits may be set to the clean data indicator.

Once the tracking extent bits of the target tracking segment are all set to the clean data indicator, the target node may be deleted from the target dynamic tree structure and/or the target tracking segment may be dynamically deallocated from memory or persistent storage for storage efficiency. In this way, nodes of the target dynamic tree structure may be traversed for processing tracking segments to identify and send dirty data to the second storage controller. Responsive to processing the hash buckets for sending dirty data to the second storage controller for updating the second storage, the replication relationship may be declared as being in a synchronous replication state (e.g., a transition to a synchronous replication engine for locally implementing write operations upon the first storage and remotely implement replications of the write operations upon the second storage before acknowledging back to clients).

In an example of utilizing the tracking structure, the tracking structure may be utilized for performing a quick resynchronization without transitioning to a snapshot based asynchronous replication state that would otherwise asynchronously replicate data using snapshots and incremental transfers of delta data between such snapshots (e.g., merely a brief transition out of the synchronous replication state may occur). For example, responsive to determining a lack of connectivity between the first storage controller and the second storage controller, incoming write requests may continue to be locally implemented upon the first storage and logged into the tracking structure for tracking dirty data within the first storage. Responsive to identifying restoration of the connectivity, the tracking structure may be utilized to identify and send dirty data to the second storage controller for updating the second storage (e.g., for catching the second storage up to a current state of the first storage).

In an example of utilizing the tracking structure, the tracking structure may be utilized for snapshot-less resynchronization. For example, the tracking structure may be persisted into persistent storage. Dirty data, resulting from incoming write requests, may be logged by setting corresponding tracking extent bits to the dirty data indicator. In an example, a count of incoming write requests, targeting a user data storage range mapped to by a tracking extent bit, may be maintained to track replication completion of multiple write requests targeting the user data storage range (e.g., otherwise, if the tracking extent bit is dirtied by both a first and second write request, and the tracking extent bit is cleared to the clean data indicator after the first write request is acknowledged as being replicated but the second write request is never replicated, then the data of the user data storage range, as modified by the unreplicated second write request, is not consistent with the second storage). The tracking extent bits may be cleared to the clean data indicator based upon receiving acknowledgments from the second storage controller that the second storage has been updated with dirty data, identify by the tracking extent bits, sent from the first storage to the second storage controller for updating the second storage.

In an example of utilizing the tracking structure, the tracking structure may be utilized for tracking dirty data for semi-synchronous replication. For a semi-synchronous replication relationship, an incoming write request is locally implemented upon the first storage. A replication of the incoming write request is sent to the second storage controller for implementation upon the second storage. An acknowledgement back to a client is only dependent upon successful completion of the local implementation. Accordingly, the tracking structure is persisted into persistent storage. Responsive to determining that the second storage controller is unable to update the second storage with dirty data sent from the first storage controller above a semi-synchronous replication update threshold (e.g., the second storage controller falls behind in keeping up with replicating write requests processed by the first storage controller), dirty data, resulting from incoming write requests implemented upon the first storage, may be logged by setting tracking extent bits to the dirty data indicator. A snapshot of the tracking structure may be captured to preserve the identification of dirty data within the first storage. The snapshot may be utilized to resynchronize the second storage with the first storage to restore a semi-synchronous replication relationship.

Figure 4:
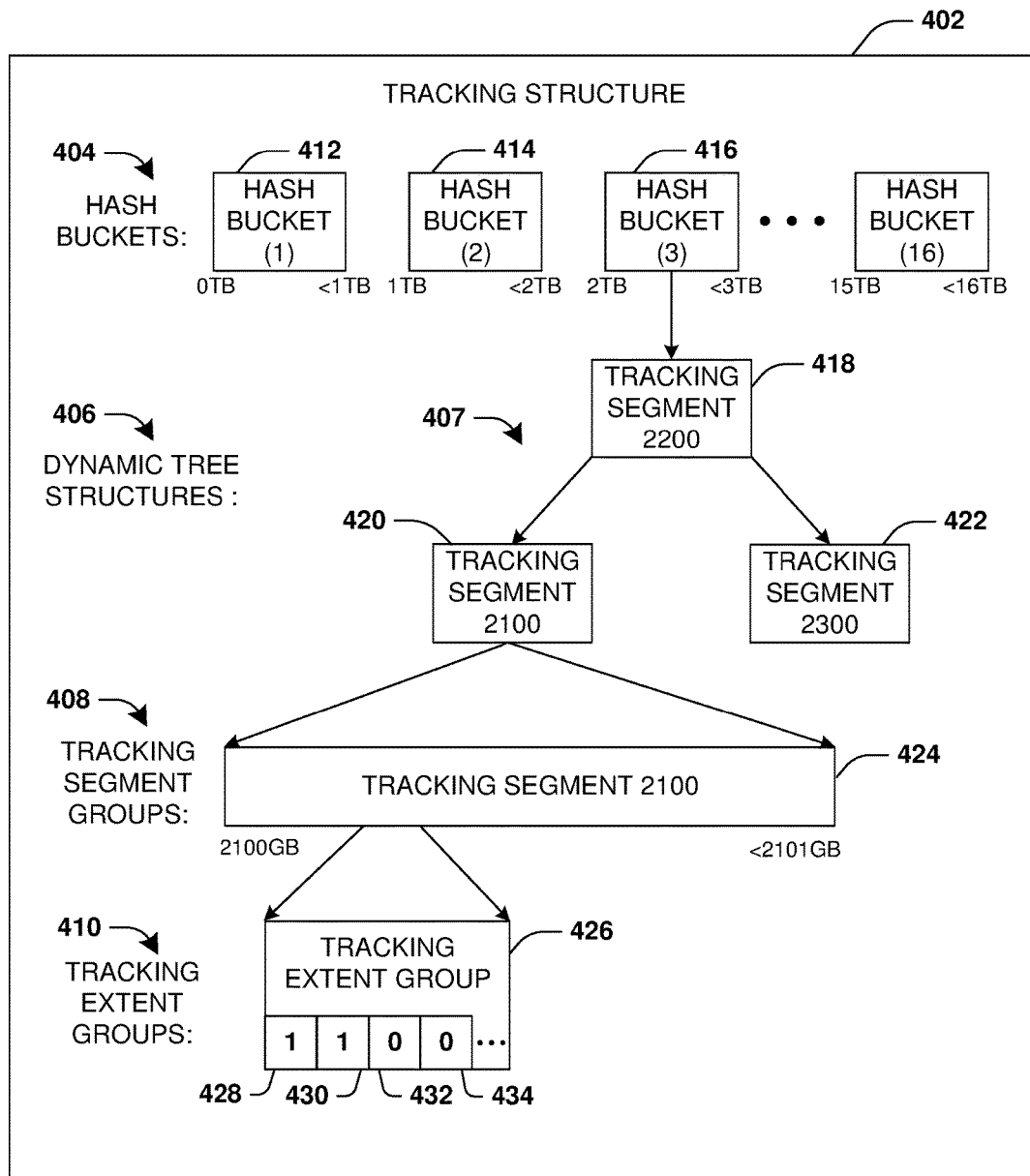
FIG. 4 is an illustration of an example of a tracking structure.

FIG. 4 illustrates an example of a tracking structure 402. The tracking structure 402 may comprise a set of hash buckets 404 corresponding to portions of first storage of user data maintained by a first storage controller. For example, the set of hash buckets 404 may comprise 16 hash buckets, where each hash bucket corresponds to 1 TB of 16 TB user data (e.g., a first hash bucket 412 mapping to a first terabyte, a second hash bucket 414 mapping to a second terabyte, a third hash bucket 416 mapping to a third terabyte, etc.). It may be appreciated that any number of hash buckets may be maintained, and that a hash bucket may correspond to any amount of user data. Dynamic tree structures 406 may be defined, within the tracking structure 402, for respective hash buckets, where one dynamic tree structure is defined for a single hash bucket. It may be appreciated that any number of dynamic tree structures may be maintained for any number of hash buckets. For example, a third dynamic tree structure 407 may be defined for the third hash bucket 416. The third dynamic tree structure 407 may comprise a first node 418 mapping to a tracking segment 2200, a second node 420 mapping to a tracking segment 2100, a third node 422 mapping to a tracking segment 2300, and/or other nodes mapping to other tracking segments within a tracking segment group of the third hash bucket 416 (e.g., the dynamic tree structures 406 may be mapped to tracking segment groups 408 of tracking segments). In an example, the tracking segment group may comprise 1,000 tracking segments, where each tracking segment corresponds to 1 GB of the 1 TB user data mapped to by the third hash bucket 416. For example, the tracking segment 2100 may correspond to a range 424 of the first storage between 2100 GB and 2101 GB. In an example, a tracking segment may map 4 kb of memory or persistent storage to 1 GB of user data. It may be appreciated that the tracking segment group may comprise any number of tracking segments, and that a tracking segment may correspond to any amount of user data and/or utilize any amount of memory or persistent storage.

The tracking structure 402 may comprise a tracking segment bitmap comprising tracking extent bits grouped into tracking extent groups 410 of tracking segments within the tracking segment groups 408. In an example, a tracking extent group may map 64 bits of memory to 2 mb of user data. It may be appreciated that the tracking extent group may map to any amount of user data and/or utilize any amount of memory or persistent storage. In an example, a tracking extent group 426 within the tracking segment 2100 may comprise tracking extent bits, such as a first tracking extent bit 428, a second tracking extent bit 430, a third tracking extent bit 432, a fourth tracking extent bit 434, and/or other tracking extent bits that may be set to either a dirty data indicator (e.g., a value of 1) or a clean data indicator (e.g., a value of 0). In an example, a tracking extent bit may map to 32 kb of user data or any other minimum range of user data that can be marked as dirty. It may be appreciated that the tracking extent bit may map to any amount of user data.

When a write request is received, a hash of an offset of the write request is used to identify a target hash bucket, of the set of hash buckets 404, mapping to tracking extent bits corresponding to a portion of the first storage that is to be modified by the write request. Accordingly, a target dynamic tree structure of the target hash bucket may be evaluated to identify such tracking extent bits to mark as dirty (e.g., either by locating a target node corresponding to a target tracking segment comprising the tracking extent bits or by dynamically creating a new node corresponding to a new tracking segment to comprise the tracking extent bits where the target node does not already exist). Similarly, the tracking structure 402, such as the dynamic tree structures 406, may be traversed to identify tracking extent bits indicative of dirty data to send to a second storage controller for updating second storage for data replication synchronization.

Figure 5A:
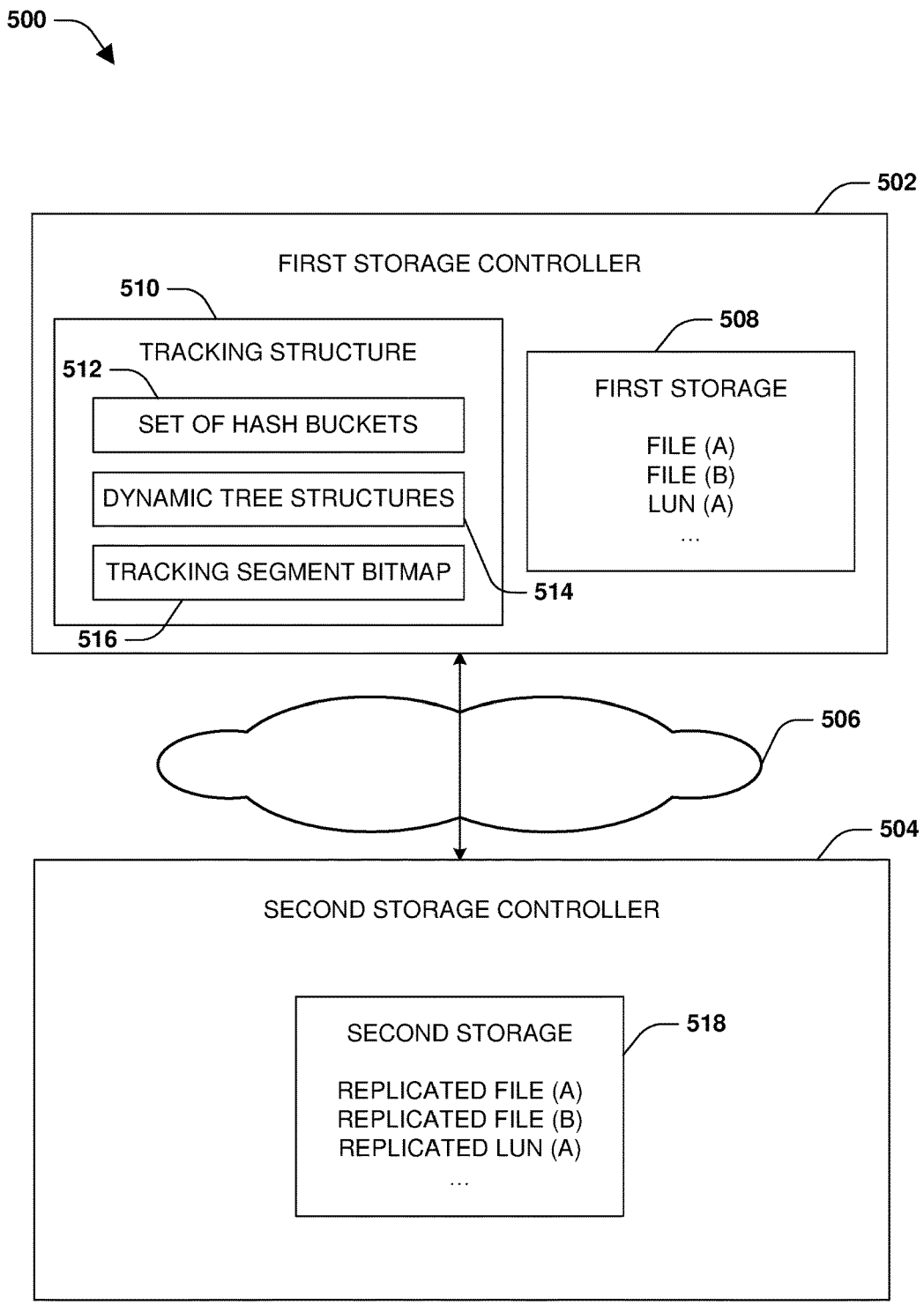
FIG. 5A is a component block diagram illustrating an exemplary computing device for utilizing a tracking structure for data replication synchronization.

FIGS. 5A-5D illustrate examples of a system 500 for utilizing a tracking structure 510 for data replication resynchronization, such as for resynchronizing second storage 518, hosted by a second storage controller 504, to a current state of first storage 508 hosted by a first storage controller 502. For example, the first storage controller 502 may be connected to the second storage controller 504 over a network 506, as illustrated in FIG. 5A. The first storage controller 502 and the second storage controller 504 may have a replication relationship, such that data written to the first storage (e.g., file (A), file (B), LUN (A), etc.) is replicated to the second storage (e.g., as replicated file (A), replicated file (B), replicated LUN (A), etc.). The first storage controller 502 may maintain a tracking structure 510. The tracking structure 510 comprises a set of hash buckets 512 defined for tracking segment groups of the first storage 508 (e.g., a hash bucket may be defined for a tracking segment group comprising a plurality of tracking segments corresponding to 1 TB or any other sized portion of the first storage 508). The tracking structure 510 may comprise dynamic tree structures for respective hash buckets, where a dynamic tree structure corresponds to a tracking segment group of tracking segments (e.g., nodes, within the dynamic tree structure, may map to tracking segments of the tracking segment group). The tracking structure 510 may comprise a tracking segment bitmap 516 comprising tracking extent bits of tracking segment groups, where a tracking extent bit is set to either a dirty data indicator or a clean data indicator.

Figure 5B:
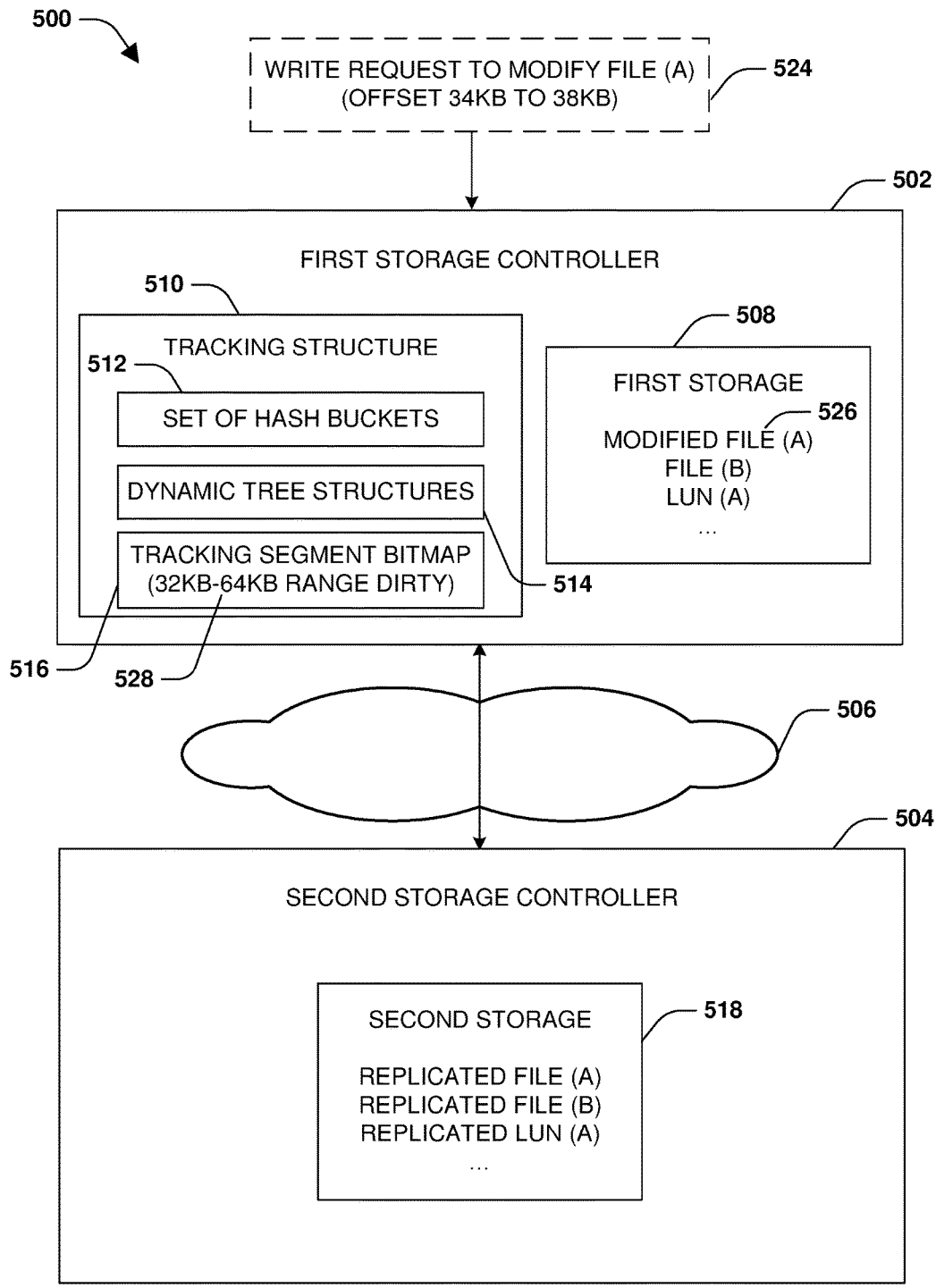
FIG. 5B is a component block diagram illustrating an exemplary computing device for utilizing a tracking structure for data replication synchronization, where write requests are logged within the tracking structure.

FIG. 5B illustrates a write request 524, to modify the file (A) from offset 34 kb to 38 kb within the first storage 508, being received by the first storage controller 502 during a logging phase. The first storage controller 502 may log the write request 524 to the tracking structure 510 by setting a tracking extent bit 528, corresponding to a 32 kb to 64 kb user data storage range of the first storage 508, to the dirty data indicator because the write request 524 falls within the 32 kb to 64 kb user data storage range. The first storage controller 502 may implement the write request 524 upon the file (A) to create a modified file (A) 526 having dirty data that may not be the same data as the replicated file (A) within the second storage 518.

Figure 5C:
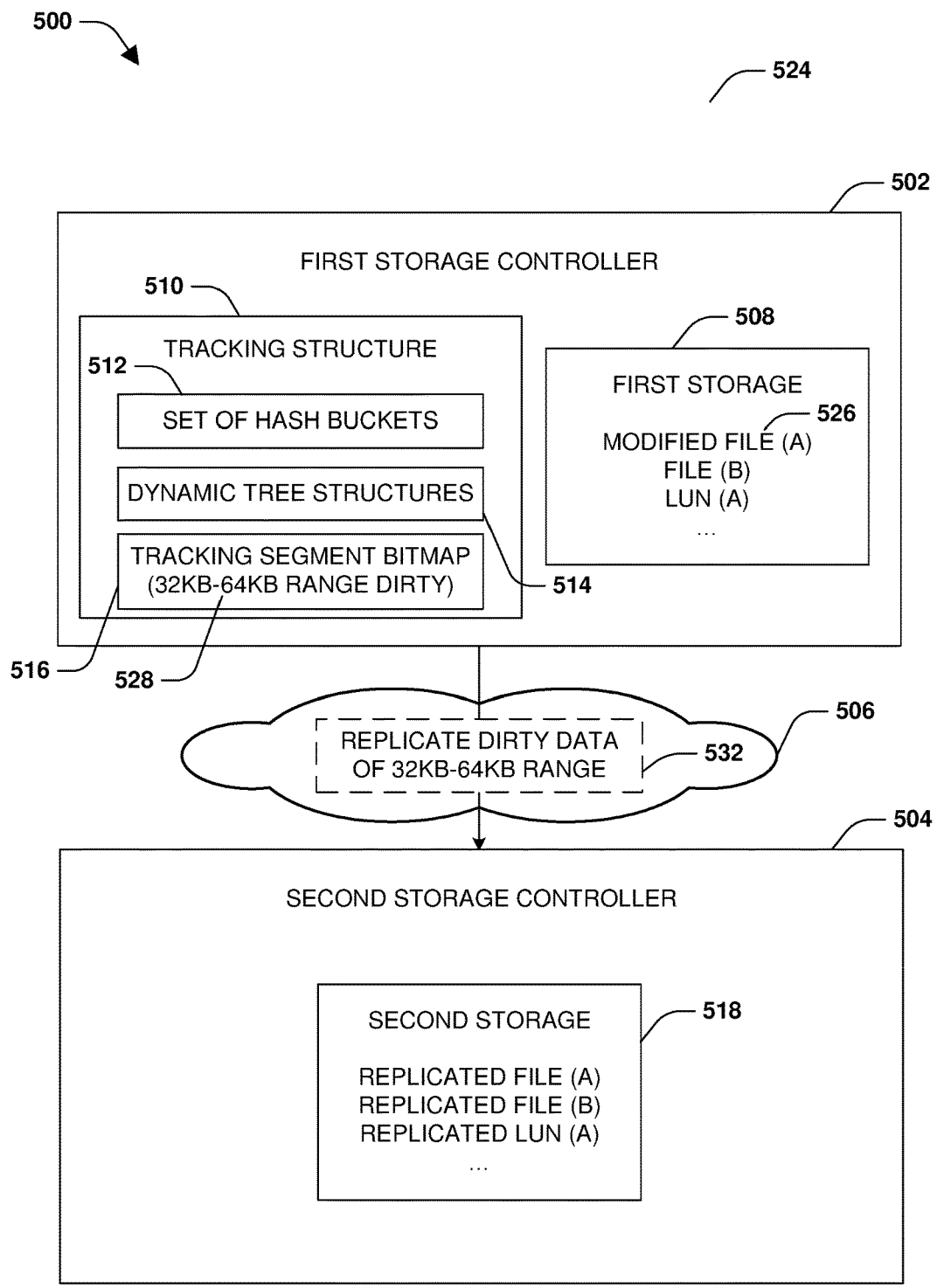
FIG. 5C is a component block diagram illustrating an exemplary computing device for utilizing a tracking structure for data replication synchronization, where dirty data, identified from the tracking structure, is replicated to a second storage controller.

FIG. 5C illustrates the tracking structure 510 being using during a resynchronization phase to resynchronize the second storage 518, such as the replicated file (A), with a current state of the first storage 508, such as the modified file (A) 526. For example, nodes within the dynamic tree structure may be traversed to identify tracking segments, within the tracking segment bitmap 516, having tracking extent bits with the dirty data indicator. For example, the tracking extent bit 528 may be set to the dirty data indicator to indicate that the 32 kb to 64 kb user data storage range of the first storage 508 has dirty data. Accordingly, the dirty data may be replicated 532 from the first storage 508 to the second storage controller 504 for updating the second storage 518.

Figure 5D:
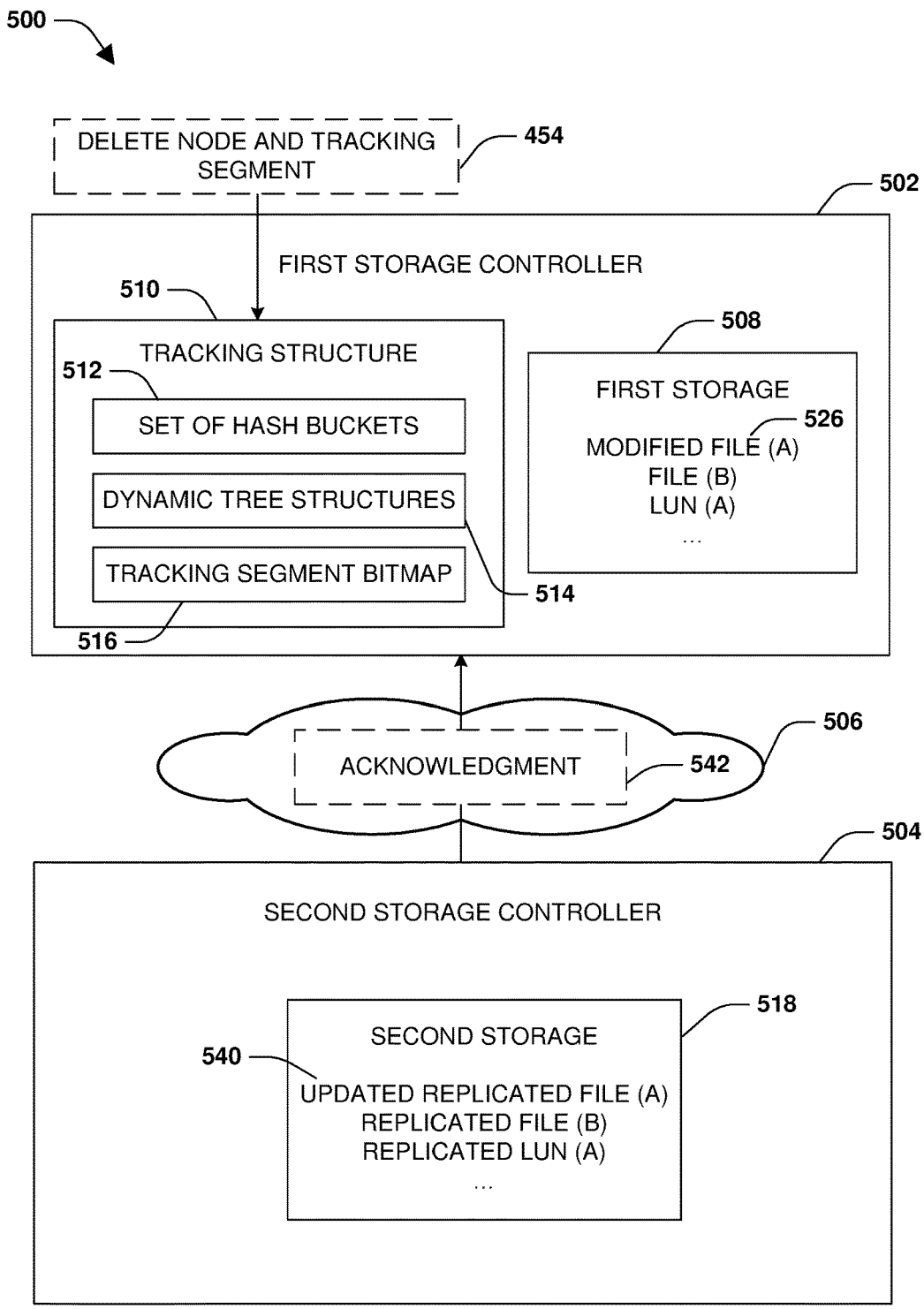
FIG. 5D is a component block diagram illustrating an exemplary computing device for utilizing a tracking structure for data replication synchronization, where dynamic tree structures and/or tracking extent bits are deallocated, for improving storage efficiency, as dirty data is successfully replicated to a second storage controller.

FIG. 5D illustrates the second storage 518 being updated with the dirty data to create an updated replicated file (A) 540 within the second storage 518. The second storage controller 504 may send an acknowledgment 542 to the first storage controller 502 that the dirty data was successfully replicated 532 to the second storage 518. The first storage controller 502 may set the tracking extent bit 528 to a clean data indicator. Once all of the tracking extent bits within the tracking segment, mapped to by the node, are cleared to the clean data indicator, the node may be removed from the dynamic tree structure and/or the tracking segment may be deallocated from memory for efficient storage.

Figure 6:
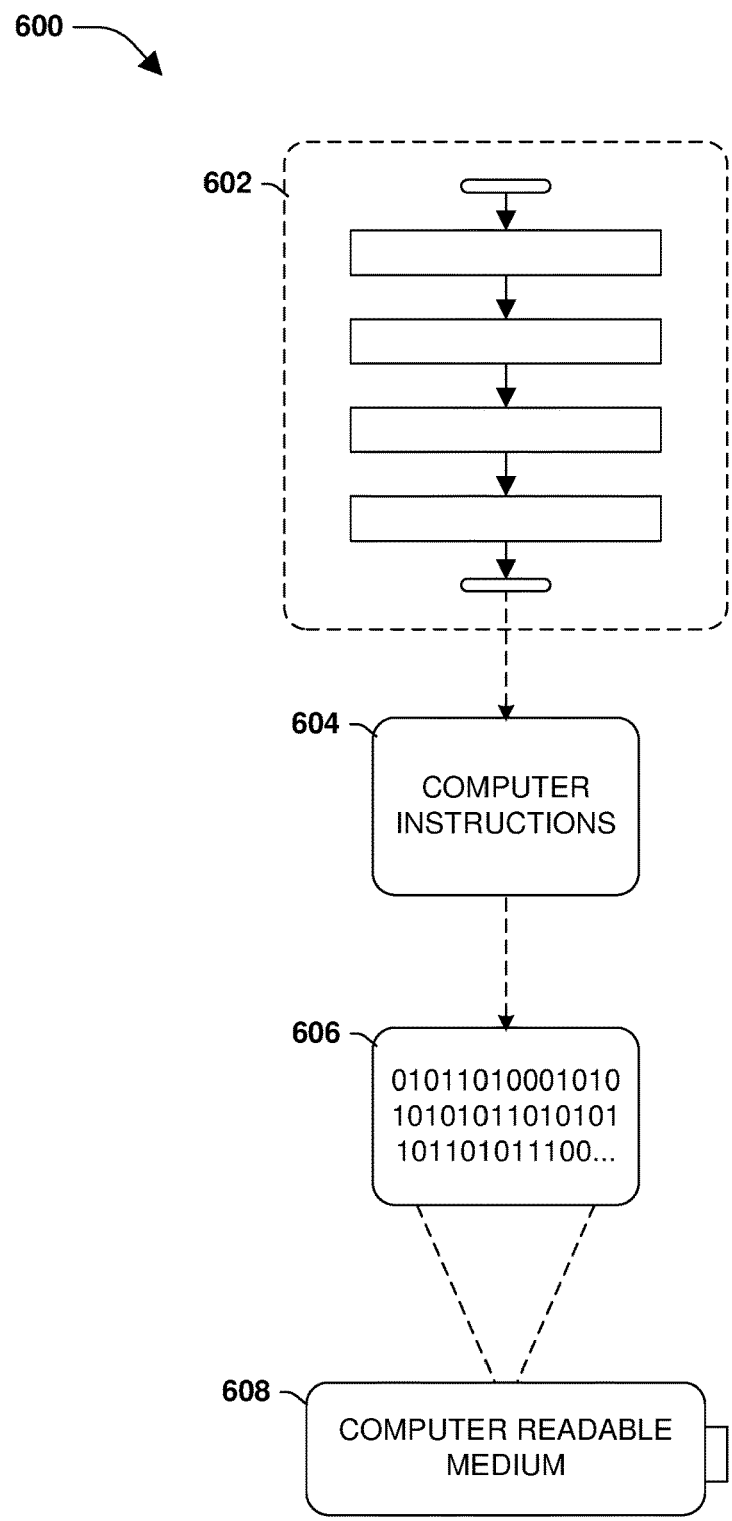
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-ft DVD-R, flash drive, a platter of a hard disk drive, etc., on which is encoded computer-readable data 606. This computer-readable data 606, such as binary data comprising at least one of a zero or a one, in turn comprises a processor-executable computer instructions 604 configured to operate according to one or more of the principles set forth herein. In some embodiments, the processor-executable computer instructions 604 are configured to perform a method 602, such as at least some of the exemplary method 300 of FIG. 3, for example. In some embodiments, the processor-executable computer instructions 604 are configured to implement a system, such as at least some of the exemplary system 500 of FIGS. 5A-5D, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    identifying a hash bucket, of a set of hash buckets encompassing different data ranges within first storage, corresponding to a range of data in the first storage and targeted by a write request;
    identifying a node for a tracking segment encompassing the range of data based upon an evaluation of nodes of a tree structure defined for the hash bucket, wherein each node corresponds to different tracking segments encompassing different ranges of data within a data range encompassed by the hash bucket, wherein the node for the tracking segment is dynamically created within the tree structure based upon the tree structure lacking nodes encompassing the range of data;
    identifying a tracking extent group, within the tracking segment, comprising bits corresponding to the range of data based upon an evaluation a tracking segment bitmap defined to comprise tracking extent bits of tracking segment groups, wherein each tracking extent group for the tracking segment corresponds to different bit ranges encompassed by the tracking segment;
    setting bits within the tracking extent group to a dirty data indicator to indicate that the range of data has been modified; and
    synchronizing second storage with data from the first storage, wherein bits with the dirty data indicator are set to a clean data indicator upon synchronization.

2. The method of claim 1, wherein the synchronizing comprises:
    performing a tracking synchronization to update the second storage to a current state of the first storage by traversing the nodes of the tree structure to evaluate bits within tracking extent groups of tracking segments represented by the nodes of the tree structure, wherein dirty data, identified by the bits within the tracking extent groups set to the dirty data indicator, are sent from the first storage to the second storage to synchronize the second storage to the current state of the first storage.

3. The method of claim 1, wherein the synchronizing comprises:
    transmitting dirty data, identified by bits within tracking extent groups that are set of the dirty data indicator, from the first storage to the second storage to synchronize the second storage to a current state of the first storage.

4. The method of claim 3, comprising:
    setting the bits from the dirty data indicator to a clean data indicator based upon receiving an acknowledgment that the second storage has been updated with the dirty data to synchronize the second storage to the current state of the first storage.

5. The method of claim 4, wherein the clean data indicator indicates that corresponding data within the first storage is synchronized with the second storage.

6. The method of claim 1, comprising:
    deleting the node from the tree structure based upon all bits of tracking extent groups of the tracking segment being set to a clean data indicator indicating that corresponding data within the first storage is synchronized with the second storage.

7. The method of claim 1, comprising:
    dynamically creating a new node within the tree structure for a new tracking segment associated with a target range of data being modified by a second write request, wherein bits within tracking extent groups of the new tracking segment are set to the dirty data indicator based upon the bits corresponding to the target range of data being modified.

8. A non-transitory machine readable medium comprising instructions for performing a method, which when executed by a machine, causes the machine to:
    identify a hash bucket, of a set of hash buckets encompassing different data ranges within first storage, corresponding to a range of data in the first storage and targeted by a write request;
    identify a node for a tracking segment encompassing the range of data based upon an evaluation of nodes of a tree structure defined for the hash bucket, wherein each node corresponds to different tracking segments encompassing different ranges of data within a data range encompassed by the hash bucket, wherein the node for the tracking segment is dynamically created within the tree structure based upon the tree structure lacking nodes encompassing the range of data;
    identify a tracking extent group, within the tracking segment, comprising bits corresponding to the range of data based upon an evaluation a tracking segment bitmap defined to comprise tracking extent bits of tracking segment groups, wherein each tracking extent group for the tracking segment corresponds to different bit ranges encompassed by the tracking segment;

set bits within the tracking extent group to a dirty data indicator to indicate that the range of data has been modified; and synchronize second storage with data from the first storage, wherein bits with the dirty data indicator are set to a clean data indicator upon synchronization.

9. The non-transitory machine readable medium of claim 8, wherein the instructions cause the machine to:

perform a tracking synchronization to update the second storage to a current state of the first storage by traversing the nodes of the tree structure to evaluate bits within tracking extent groups of tracking segments represented by the nodes of the tree structure, wherein dirty data, identified by the bits within the tracking extent groups set to the dirty data indicator, are sent from the first storage to the second storage to synchronize the second storage to the current state of the first storage.

10. The non-transitory machine readable medium of claim 8, wherein the instructions cause the machine to:

transmit dirty data, identified by bits within tracking extent groups that are set of the dirty data indicator, from the first storage to the second storage to synchronize the second storage to a current state of the first storage.

11. The non-transitory machine readable medium of claim 10, wherein the instructions cause the machine to:

set the bits from the dirty data indicator to a clean data indicator based upon receiving an acknowledgment that the second storage has been updated with the dirty data to synchronize the second storage to the current state of the first storage.

12. The non-transitory machine readable medium of claim 11, wherein the clean data indicator indicates that corresponding data within the first storage is synchronized with the second storage.

13. The non-transitory machine readable medium of claim 8, wherein the instructions cause the machine to:

delete the node from the tree structure based upon all bits of tracking extent groups of the tracking segment being set to a clean data indicator indicating that corresponding data within the first storage is synchronized with the second storage.

14. The non-transitory machine readable medium of claim 8, wherein the instructions cause the machine to:

dynamically create a new node within the tree structure for a new tracking segment associated with a target range of data being modified by a second write request, wherein bits within tracking extent groups of the new tracking segment are set to the dirty data indicator based upon the bits corresponding to the target range of data being modified.

15. A computing device comprising:

a memory comprising machine executable code having stored thereon instructions for performing a method; and a processor coupled to the memory, the processor configured to execute the machine executable code to cause the processor to:

identify a hash bucket, of a set of hash buckets encompassing different data ranges within first storage, corresponding to a range of data in the first storage and targeted by a write request;

identify a node for a tracking segment encompassing the range of data based upon an evaluation of nodes of a tree structure defined for the hash bucket, wherein each node corresponds to different tracking segments encompassing different ranges of data within a data range encompassed by the hash bucket, wherein the node for the tracking segment is dynamically created within the tree structure based upon the tree structure lacking nodes encompassing the range of data;

identify a tracking extent group, within the tracking segment, comprising bits corresponding to the range of data based upon an evaluation a tracking segment bitmap defined to comprise tracking extent bits of tracking segment groups, wherein each tracking extent group for the tracking segment corresponds to different bit ranges encompassed by the tracking segment;

set bits within the tracking extent group to a dirty data indicator to indicate that the range of data has been modified; and synchronize second storage with data from the first storage, wherein bits with the dirty data indicator are set to a clean data indicator upon synchronization.

16. The computing device of claim 15, wherein the machine executable code causes the processor to:

perform a tracking synchronization to update the second storage to a current state of the first storage by traversing the nodes of the tree structure to evaluate bits within tracking extent groups of tracking segments represented by the nodes of the tree structure, wherein dirty data, identified by the bits within the tracking extent groups set to the dirty data indicator, are sent from the first storage to the second storage to synchronize the second storage to the current state of the first storage.

17. The computing device of claim 15, wherein the machine executable code causes the processor to:

transmit dirty data, identified by bits within tracking extent groups that are set of the dirty data indicator, from the first storage to the second storage to synchronize the second storage to a current state of the first storage.

18. The computing device of claim 17, wherein the machine executable code causes the processor to:

set the bits from the dirty data indicator to a clean data indicator based upon receiving an acknowledgment that the second storage has been updated with the dirty data to synchronize the second storage to the current state of the first storage.

19. The computing device of claim 18, wherein the clean data indicator indicates that corresponding data within the first storage is synchronized with the second storage.

20. The computing device of claim 15, wherein the machine executable code causes the processor to:

delete the node from the tree structure based upon all bits of tracking extent groups of the tracking segment being set to a clean data indicator indicating that corresponding data within the first storage is synchronized with the second storage.

* * * * *